United States Patent
Kumar et al.

(10) Patent No.: US 10,958,555 B2
(45) Date of Patent: Mar. 23, 2021

(54) REAL-TIME APPLICATION-DRIVEN SYNTHETIC PROBING

(71) Applicant: Juniper Networks, Inc., Sunnyvale, CA (US)

(72) Inventors: Rajneesh Kumar, Bangalore (IN); Sai Sundar Ramamurthy, Bangalore (IN); Vijay Sai Ram Paruchuri, Bangalore (IN); Unni Dilip, Bangalore (IN); Ravi Kumar G V Subrahmanya, Hyderabad (IN); Bhaskar Jain, Bangalore (IN); Sanjay Kumar Gupta, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/354,428

(22) Filed: Mar. 15, 2019

(65) Prior Publication Data
US 2020/0296023 A1 Sep. 17, 2020

(51) Int. Cl.
*H04L 12/26* (2006.01)
*H04W 24/08* (2009.01)

(52) U.S. Cl.
CPC .......... *H04L 43/0894* (2013.01); *H04L 43/12* (2013.01); *H04W 24/08* (2013.01)

(58) Field of Classification Search
CPC .............................. H04L 43/0894; H04L 43/12
See application file for complete search history.

(56) References Cited

U.S. PATENT DOCUMENTS

| | | |
|---|---|---|
| 6,459,682 B1 | 10/2002 | Ellesson et al. |
| 8,762,570 B2 | 6/2014 | Qian et al. |
| 2011/0113202 A1 | 5/2011 | Branover et al. |
| 2016/0197813 A1* | 7/2016 | Jagannath ........... H04L 41/0806 370/252 |
| 2017/0373950 A1* | 12/2017 | Szilagyi ................. H04L 43/00 |
| 2018/0069793 A1* | 3/2018 | Narayanan ........... H04L 47/215 |
| 2020/0014628 A1* | 1/2020 | Yang ................... H04L 43/0852 |

FOREIGN PATENT DOCUMENTS

WO 2013184846 A1 12/2013

* cited by examiner

*Primary Examiner* — Yemane Mesfin
*Assistant Examiner* — Henry Baron
(74) *Attorney, Agent, or Firm* — Shumaker & Sieffert, P.A.

(57) ABSTRACT

In general, the disclosure describes techniques for evaluating application quality of experience metrics over a software-defined wide area network. For instance, a network device may receive an application data packet of a data flow for an application and send a first set of probe packets, configured according to an initial probing profile, over each of one or more links. The network device may monitor the data flow to determine one or more characteristics of the data flow and generate an updated probing profile based on the one or more characteristics of the data flow. The network device may then send a second set of one or more probe packets, configured according to the updated probing profile, over each of the one or more links.

20 Claims, 5 Drawing Sheets

REAL-TIME APPLICATION-DRIVEN SYNTHETIC PROBING

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, and transactions simultaneously. The increased amount and variety of subscriber sessions and packet flows create challenges for network service providers with respect to network performance, such as latency, delay, and jitter.

SUMMARY

In general, the disclosure describes techniques for adjusting a synthetic probing process based one or more of system state, application traffic, and historical models of the application traffic for particular applications, with the probing process generating various Quality of Experience (QoE) metrics for the link on which the traffic flow will be transmitted. In other words, when a Software-Defined Wide Area Network (SD-WAN) appliance that implements the techniques described herein receives application traffic, the SD-WAN appliance dynamically adjusts various characteristics of the probe packets based on the application traffic being received such that the probes mimic the actual application traffic being received for the particular application. The characteristics of the probe packets may also be referred to herein as a "probing profile."

In some SD-WANs, the SD-WAN appliance may specify a path for data flows between client devices and application servers. These paths are typically selected using service-level agreement (SLA) parameters and various QoE metrics of the WAN links. The SLA parameters may be static in nature or at least predetermined prior to the SD-WAN appliance receiving the flow. The metrics of the various WAN links, on the other hand, may be more dynamic as the metrics describing the capabilities of the particular WAN link may vary based on various current aspects of the network. These metrics are obtained by sending probe packets on the various links and analyzing the results of the transmission, where probe packets having similar characteristics as the data packets in the data flow reasonably measure how the particular WAN link could handle the data flow.

Instead of sending one or more preconfigured probe packets over each WAN link, the techniques described herein may perform adjustment functions on the probe packets by dynamically adjusting various characteristics of a probing profile, such as a probing frequency, a differentiated services code point, a forwarding class, a probe packet size, a burst presence, or a burst size, based on characteristics of the data flow being received. The SD-WAN appliance described herein adjusts the probing profile such that the probe packets generated in accordance with the probing profile are similar to the data packets in the traffic being received and transmitted by the SD-WAN appliance. The SD-WAN appliance sends the probe packets over each of the links in accordance with the updated probing profile, and refrains from sending any more probe packets configured with the initial probing profile. As described above, the QoE metric gathering process is more efficient and more correlated to the metrics determinative of SLA parameter satisfaction when the probe packets are similar to the application data packets.

While the techniques may include dynamically adjusting the probing profile while the data flow is being processed, the techniques described herein may also include machine learning techniques to learn various patterns and characteristics of data flows belonging to an application. The SD-WAN appliance may store this information in an application traffic model, accessing this model when future traffic is received from this application. The SD-WAN appliance may proactively configure the probing profile to have characteristics similar to the stored application traffic model by initializing the probing process with the predicted probing profile, eliminating the initial monitoring and evaluation stages to make the SD-WAN system even more efficient and effective.

These techniques may also be extended within queues of the respective links. For instance, a singular WAN link may include multiple different queues. Rather than send the one or more probe packets over each queue of the WAN link, the SD-WAN appliance may only send the one or more probe packets over the particular queue that is experiencing the traffic. This additional level of granularity may increase the benefits of the techniques described herein.

There may be one or more advantages to using the techniques described herein. As one example, the synthetic probing process becomes real time in nature, using a balanced approach of probing. The SD-WAN appliance that implements the techniques described herein may significantly reduce the probability of false negative and false positive SLA violations. By using the techniques described herein, there may not be any manual intervention required to improve the accuracy, and the SD-WAN may not generate a synthetic burst, which can degrade the system and network state. The SD-WAN appliance may adjust the load on the system dynamically, as per real application traffic and/or predicted traffic using the historical model, reducing the bandwidth consumed by the SD-WAN appliance and increasing the efficiency of the SD-WAN system.

In one example of the techniques described herein, a method is described, the method including, in response to receiving, by a network device, an application data packet of a data flow for an application, sending, by the network device, a first set of one or more probe packets over each of one or more links to measure quality of experience (QoE) metrics for the respective link. The first set of one or more probe packets are sent in accordance with an initial probing profile that includes one or more characteristics of the first set of one or more probe packets sent over each of the one or more links. The method further includes monitoring, by the network device, the data flow to determine one or more characteristics of the data flow. The method also includes generating, by the network device and based on the one or more characteristics of the data flow, an updated probing profile that includes one or more updated characteristics of a second set of one or more probe packets to be sent over each of the one or more links to measure the QoE metrics for the respective link. At least one of the updated characteristics differs from the one or more characteristics of the initial probing profile. The method further includes sending, by the network device, the second set of one or more probe packets over each of the one or more links in accordance with the updated probing profile.

In another example of the techniques described herein, a network device is described. The network device includes a memory. The network device also includes one or more processors in communication with the memory. The one or more processors are configured to, in response to receiving an application data packet of a data flow for an application, send a first set of one or more probe packets over each of one or more links to measure quality of experience (QoE) metrics for the respective link. The first set of one or more probe packets are sent in accordance with a probing profile that includes one or more characteristics of the first set of one or more probe packets sent over each of the one or more links. The one or more processors are further configured to monitor the data flow to determine one or more characteristics of the data flow. The one or more processors are also configured to generate, based on the one or more characteristics of the data flow, an updated probing profile that includes one or more updated characteristics of a second set of one or more probe packets to be sent over each of the one or more links to measure the QoE metrics for the respective link. At least one of the updated characteristics differs from the one or more characteristics of the initial probing profile. The one or more processors are further configured to send the second set of one or more probe packets over each of the one or more links in accordance with the updated probing profile.

In another example of the techniques described herein, a non-transitory computer-readable storage medium is described, the non-transitory computer-readable storage medium storing instructions thereon that when executed cause one or more processors, via execution of a software-defined networking (SDN) device, to, in response to receiving an application data packet of a data flow for an application, send a first set of one or more probe packets over each of one or more links to measure quality of experience (QoE) metrics for the respective link. The first set of one or more probe packets are sent in accordance with a probing profile that includes one or more characteristics of the first set of one or more probe packets sent over each of the one or more links. The instructions further cause the one or more processors to monitor the data flow to determine one or more characteristics of the data flow. The instructions also cause the one or more processors to generate, based on the one or more characteristics of the data flow, an updated probing profile that includes one or more updated characteristics of a second set of one or more probe packets to be sent over each of the one or more links to measure the QoF metrics for the respective link. At least one of the updated characteristics differs from the one or more characteristics of the initial probing profile. The instructions further cause the one or more processors to send the second set of one or more probe packets over each of the one or more links in accordance with the updated probing profile.

The details of one or more examples are set forth in the accompanying drawings and the description below. Other features, objects, and advantages will be apparent from the description and drawings, and from the claims.

DETAILED DESCRIPTION

Figure 1:
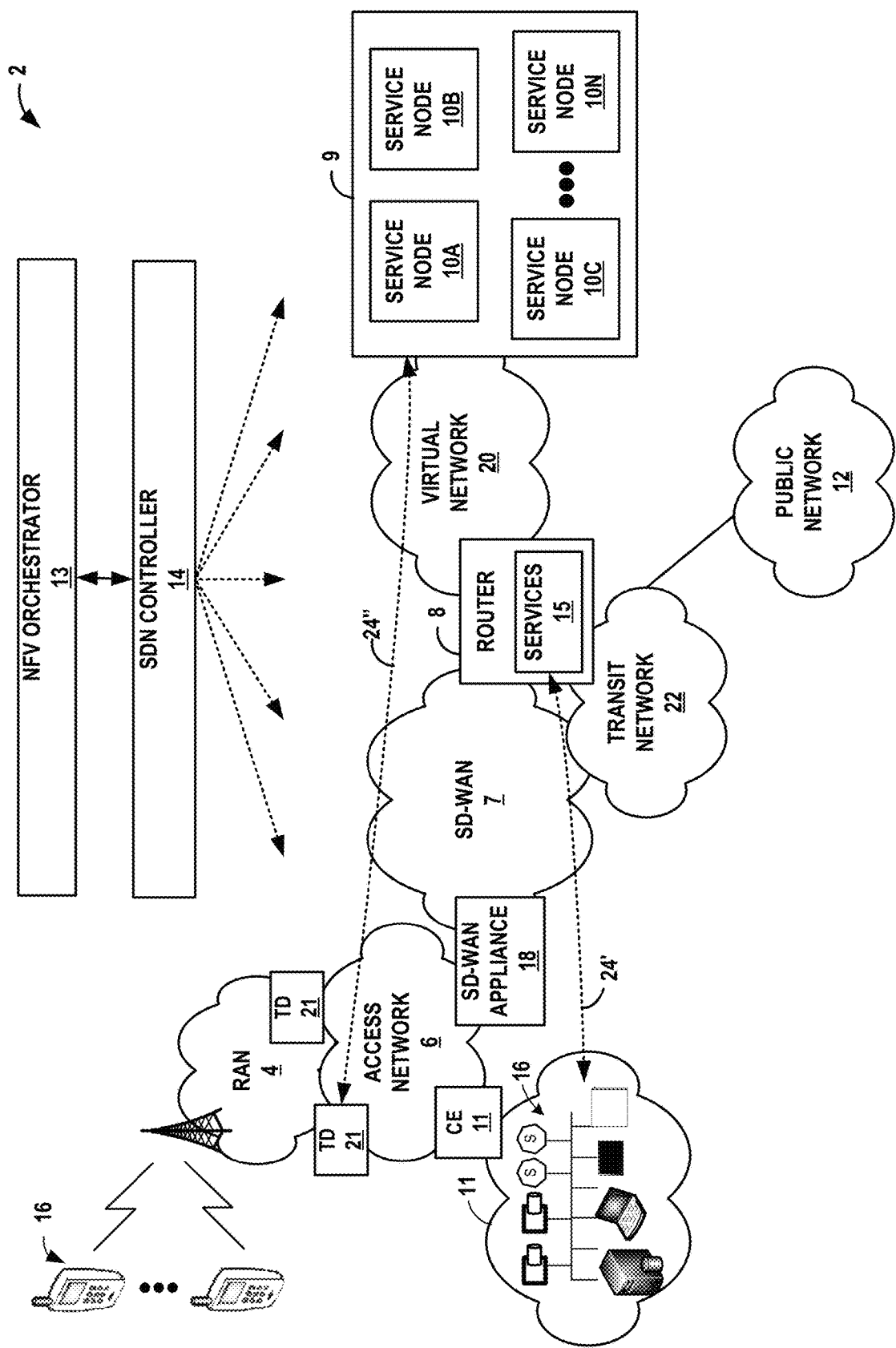
FIG. 1 is a block diagram illustrating an example software-defined wide area network system that adjusts probing frequencies and parameters based on current and/or historical application traffic, in accordance with the techniques of this disclosure.

FIG. 1 is a block diagram illustrating an example software-defined wide area network system that adjusts probing frequencies and parameters based on current and/or historical application traffic, in accordance with the techniques of this disclosure.

The example network system of FIG. 1 includes a SD-WAN system 2 that operates as a private network to provide packet-based network services to subscriber devices 16. That is, SD-WAN system 2 provides authentication and establishment of network access for subscriber devices 16 such that a subscriber device may begin exchanging data packets with public network 12, which may be an internal or external packet-based network such as the Internet.

In the example of FIG. 1, SD-WAN system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (5), televisions, appliances, etc. In addition, subscriber devices 16 may comprise mobile devices that access the data services of SD-WAN system 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS), In examples of network 2 that include a cellular access network as access network 6, router 8 may represent a mobile gateway, for example, a Gateway General Packet Radio Service (CPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access SD-WAN system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, SD-WAN system 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, SD-WAN system 2 comprises a software defined network (SDN) and network functions virtualization (NFV) architecture. SDN controller device 14 may provide a high-level controller for configuring and managing the routing and switching infrastructure of SD-WAN system 2. MN orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced. VMs. In other examples, service nodes 10 may be gateway devices or other routers. In further examples, the functionality described with respect to each of service nodes 10 may be implemented in a switch, service card, or another network element or component.

As described herein, elements within SD-WAN system 2, such as SD-WAN appliance 18, perform application data monitoring using various application quality of experience (QoE) metric functions, such as real-time performance monitoring (RPM) or two-way active measurement protocol (TWAMP), for example. That is, RPM and TWAMP may be used within SD-WAN system 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliance 18 is configured to perform the QoE metric predictions. SD-WAN appliance 18 allows for load sharing across connections and adjusts traffic flows based on network conditions to improve performance.

SD-WAN appliance 18, which performs the traffic monitoring functions described herein, also determines QoE metrics, such as service level agreement (SLA) metrics that include round-trip time (RTT), jitter, and packet loss, which were influenced by applications' real-time parameters like packet size, queues and burst of packets to determine the best path. However, different applications have different packet sizes in their data flows. Furthermore, different applications have different traffic patterns, some of which may be inconsistent with different levels of burst and bandwidth usage during the normal execution of the application. This can lead to false positives regarding a link's ability to handle the application traffic if a large number of packets are unexpectedly received for the application. As described below with respect to FIGS. 2-4, the techniques described herein show how SD-WAN appliance 18 can implement a machine learning algorithm to determine historical traffic patterns for various applications and adjust the probing frequency and other probing parameters based on the received application traffic.

Modern applications present very diverse traffic patterns. These applications and their associated protocols have their own traffic features and volumes. In some examples, each application may have distinct packet size distribution, as well. In contrast to a system in which synthetic probe packets are not dynamic and are merely sent with predefined burst, packet size, bytes per second, and packets per second (PPS), the techniques of this disclosure can dynamically adjust the characteristics of sent probe packets based on detected application traffic conditions, on a per-flow basis. The techniques of this disclosure may avoid false positive and false negative SLA conditions that may otherwise occur due to the drastic inconsistencies displayed in some applications.

Despite these inconsistencies, applications may have patterns to their inconsistencies, and these patterns can be learned and accounted for by the system described herein. In some instances of the techniques described herein, SD-WAN appliance 18 is configured to predict when a spike in data is going to be received via the traffic flow for a particular application. In such instances, SD-WAN appliance 18 may increase and decrease the frequency, in real-time, of synthetic probing in direct correlation to the amount of traffic being received in the flow. In this way, SD-WAN appliance 18 may more quickly determine when an SLA violation is encountered and take action to ensure a minimal loss in the various QoE metrics for the particular application.

In accordance with the techniques described herein, SD-WAN appliance 18, may receive an application data packet of a data flow for an application. SD-WAN appliance 18 may then send a first set of one or more probe packets over each of one or more links to measure QoE metrics for the respective link, where the first set of one or more probe packets are sent in accordance with a probing profile that includes one or more characteristics of the first set of one or more probe packets sent over each of the one or more links. SD-WAN appliance 18 may monitor the data flow to determine one or more characteristics of the data flow. SD-WAN appliance 18 may generate, based on the one or more characteristics of the data flow, an updated probing profile that includes one or more updated characteristics of a second set of one or more probe packets to be sent over each of the one or more links to measure the QoE metrics for the respective link. In the updated probing profile, at least one of the updated characteristics differs from the one or more characteristics of the initial probing profile. SD-WAN appliance 18 may send the second set of one or more probe packets over each of the one or more links in accordance with the updated probing profile, thereby refraining from sending any additional probe packets in accordance with the initial probing profile.

In some examples, the metrics carried by QoE probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

Figure 2:
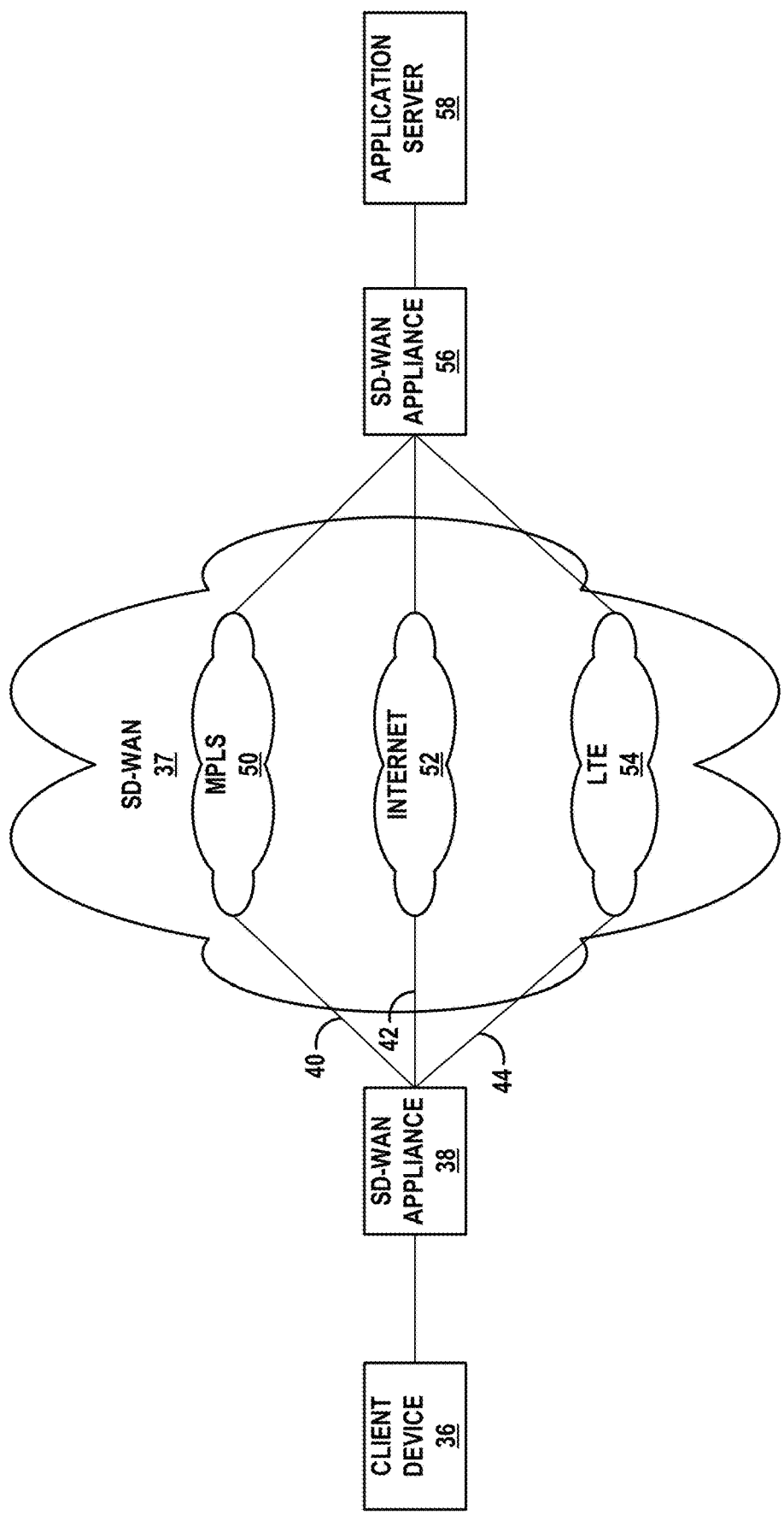
FIG. 2 is a block diagram illustrating an example software-defined wide area network, in accordance with one or more techniques of this disclosure.

FIG. 2 is a block diagram illustrating an example SD-WAN 37, in accordance with one or more techniques of this disclosure. In the example described herein, SD-WAN 37 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 37 may include any number of links of any suitable type for transmitting data flows between the client side (e.g., client device 36 and SD-WAN appliance 38) and the application side (e.g., SD-WAN appliance 56 and application server 58).

In accordance with the techniques described herein, SD-WAN appliance 38 may receive an application data packet traffic flow for a particular application. For instance, client device 36 may begin executing an application locally. The execution of the application may include communicating with application server 58, and SD-WAN appliance 38 may be configured to forward the data flow from client device 36 to application server 58 via any of links 40, 42, and 44.

Upon receiving the data flow for the application from client device 36, SD-WAN appliance 38 may assign the data flow to one of links 40, 42, 44. SD-WAN appliance 38 may perform this assignment based on the link being the default link for the system, the link being the default link for the application, or the link being an optimal link at the time based on QoE metrics for each of links 40, 42, and 44. For instance, SD-WAN appliance 38 may assign the data flow to internet link 42. In addition to assigning the data flow, SD-WAN appliance 38 may also send a first set of one or more probe packets over at least internet link 42, and potentially each of links 40, 42, and 44, to measure QoE metrics for the respective link, where the first set of one or more probe packets are sent in accordance with an initial probing profile that includes one or more characteristics of the first set of one or more probe packets sent over the respective links. In the example of FIG. 2, the probe packets may have an assured forwarding class with a 512-byte packet size.

SD-WAN appliance 38 may then monitor the data flow as it traverses through SD-WAN appliance 38 and over internet link 42 to determine one or more characteristics of the data flow. These characteristics may include one or more of a traffic rate over time indicating an amount of data received per unit of time throughout the duration of the data flow, a differentiated services code point, a forwarding class, a packet size, a burst presence, a burst size, or any other characteristic of a data flow that can be mimicked by probe packets. For instance, SD-WAN appliance 38 may determine that the flow has an expedited forwarding class with a 256-byte packet size.

Based on the one or more characteristics of the data flow, SD-WAN appliance 38 may generate an updated probing profile that includes one or more updated characteristics of a second set of one or more probe packets to be sent over at least internet link 42 to measure the QoE metrics for the respective link. At least one of the updated characteristics differs from the one or more characteristics of the initial probing profile. Ultimately, the updated probing profile is a dynamic set of one or more properties for the second set of one or more probe packets that change over time based on the one or more characteristics for the data flow at a particular time. These properties could include a frequency at which the probe packets will be sent over the various links, a differentiated services code point, a forwarding class, a packet size, a burst presence, a burst size, or any other characteristic of a data flow that can be mimicked by probe packets. In other words, the probe profile may specify which probe packets, and the various characteristics of the probe packets, will be sent over each link. In the example of FIG. 2, since the data flow has an expedited forwarding class with a 256-byte packet size, SD-WAN appliance 38 may generate the updated probing profile such that any probe packets generated and sent according to the updated probing profile have the expedited forwarding class and are 256 bytes in size, as opposed to the assured forwarding class and 512 bytes of the initial probing profile. SD-WAN appliance 38 may then send the second set of one or more probe packets over each of the one or more links in accordance with the updated probing profile.

In some examples, SD-WAN appliance 38 may generate an application traffic model for the application based on the one or more characteristics and store the application traffic model in memory. At a later time, if SD-WAN appliance 38 receives application traffic from the application, SD-WAN 38 may access this model to dynamically develop a predicted probing profile for the probe packets. As the model currently only contains a single instance of application traffic for this application, the predicted probing profile may be the same as the updated probing profile dynamically determined in the first instance of processing the first data flow.

Since most data flows are unique, SD-WAN appliance 38 may continue to monitor the traffic of the newly received flow, using machine learning techniques to update the application traffic model to represent a combination of the two flows. SD-WAN appliance 38 may continue updating the application traffic model as more and more flows are received for the application, ultimately generating an approximation of a typical data flow for the particular application. Since the application traffic model is representative of a typical data flow, generating a predicted probing profile based on this application traffic model may provide SD-WAN appliance 38 with a good starting approximation for probe packets that resemble the expected application traffic. SD-WAN appliance 38 may continue to adapt the probing profiles as the traffic is received and processed, providing a predictive approach that can initialize the probing process with an accurate prediction of the data flows, as well as a dynamic approach that fine tunes the probing profile for the actual data that is being processed by SD-WAN appliance 38.

SD-WAN appliance 38 may employ various machine learning techniques in assigning a class to each of the data flows. Machine learning may refer to a set of mathematical modeling processes that allow a computer to learn without being explicitly programmed. For example, machine learning may include Monte Carlo simulation style experimentation. Machine learning for purposes of device modeling may require large amounts of operational data with a high amount of entropy (or, in other words, randomness) relative to other types of modeling algorithms. For accurate model creation, machine learning may employ real world data, but such real-world data is often difficult to collect due to privacy and other concerns. Furthermore, machine learning may require data from most if not all available parameter configurations.

For instance, SD-WAN appliance 38 may analyze various applications to generate a model of those characteristics typically found in application traffic for a particular known application. A large amount of data may be fed into SD-WAN appliance 38 to create the initial model, with a significant number of examples of application data packets for each class being analyzed by SD-WAN appliance 38. This model may provide an indication of how variable different applications can be. Upon receiving further application traffic, SD-WAN appliance 38 may compare the characteristics to the various data for the particular application trained into SD-WAN appliance 38. Based on how the determined combination of characteristics compare to the reference combinations trained into SD-WAN appliance 38, SD-WAN appliance 38 may determine whether, and to what extent, SD-WAN appliance 38 may need to update the machine learning model. SD-WAN appliance 38 may consistently adjust the machine learning model to keep an up-to-date record of possible variations in the particular application's traffic.

Further, this machine learning may be unsupervised, meaning that SD-WAN appliance 38 may update the model used based on the classified application data flows without knowing the true outcome of the classification. SD-WAN appliance 38 may consistently update the machine learning model based on known data, and also update the machine learning model based on the classifications without confirmation that the classifications are correct. This would provide more examples to include in the training for SD-WAN appliance 38.

In some instances, SD-WAN appliance 38 may perform these techniques for multiple queues, or overlay paths, in each of WAN links 40, 42, and 44. For instance, Internet link 42 may include eight different queues or overlay links that are available to handle the data flow. Rather than generically send the plurality of probe packets to internet link 42, SD-WAN appliance 38 may send the probe packets according to the initial and updated probing profiles on the queues within internet link 42 to obtain, in a more fine-grained sense, metrics for the queue in internet link 42. Throughout this disclosure, any technique performable on a per-link basis may also be performed on a per-queue basis within the respective link, including re-assigning data flows to other queues within the same link or re-assigning data flows from a queue in one link to a queue in a different link.

Figure 3:
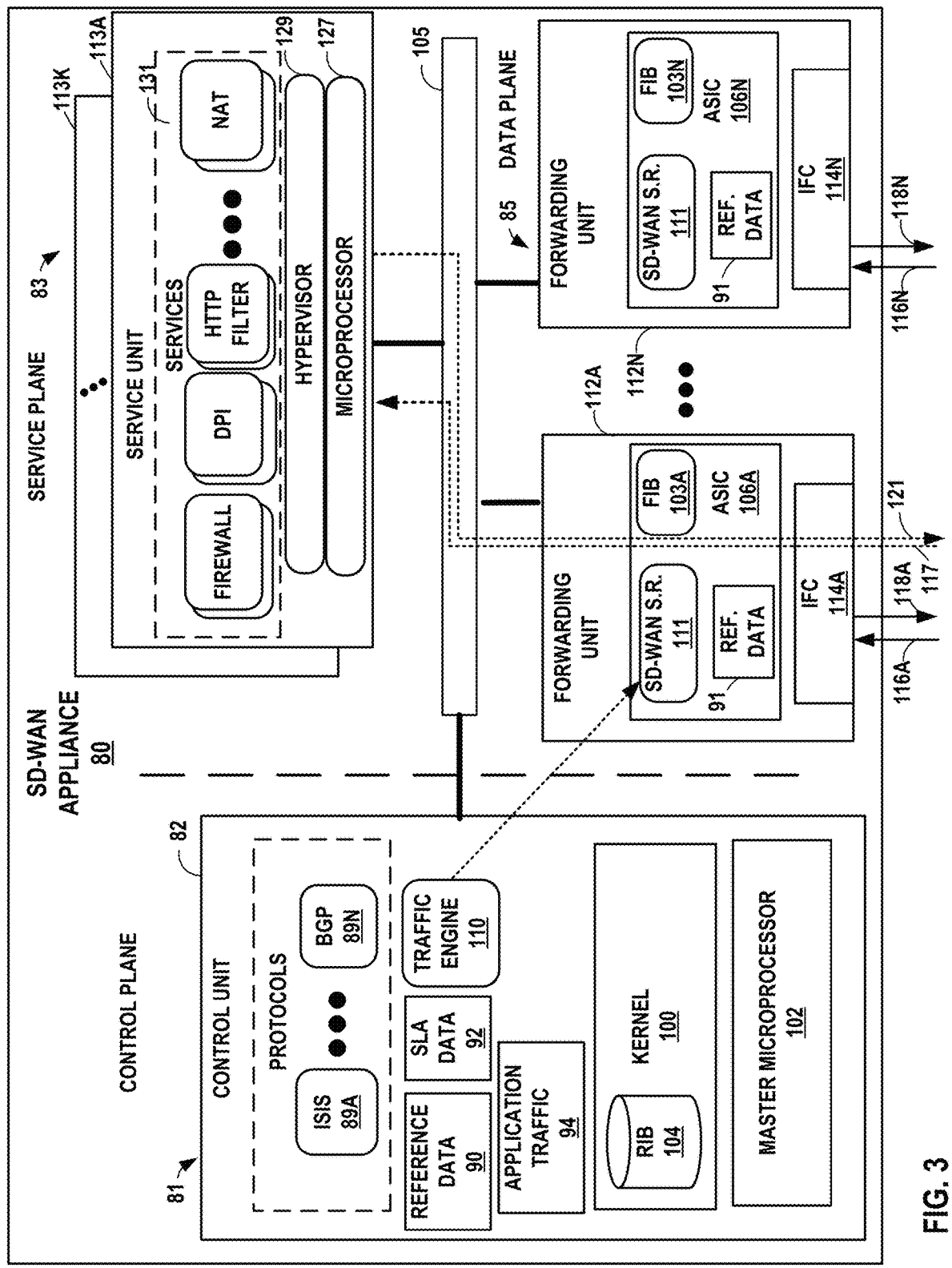
FIG. 3 is a block diagram illustrating an example network device configured to execute one or more adjustment functions on probing frequencies and parameters based on current and historical application traffic using a traffic engine, in accordance with the techniques of this disclosure.

FIG. 3 is a block diagram illustrating an example network device configured to execute one or more adjustment functions on probing frequencies and parameters based on current and historical application traffic using a traffic engine 110, in accordance with the techniques of this disclosure. While the network device may be any network device configured to perform the techniques described herein, the network device may be an example of SD-WAN appliance 18 of FIG. 1 or SD-WAN appliance 38 of FIG. 2. SD-WAN appliance 80 may be described herein within the context of SD-WAN system 2 of FIG. 1, and may represent any of routers 8 or SD-WAN appliance 18, for example. Moreover, while described with respect to a particular network device, e.g., a router, the techniques may be implemented by any network device that may operate as an SD-WAN appliance, such as a client device, a Layer 3 (L3) or L2/L3 switch, or server.

In this example, SD-WAN appliance 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 3, control plane 81 includes control unit 82 having master microprocessor(s) 102, which executes device management services, subscriber authentication and control plane routing functionality of SD-WAN appliance 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as traffic engine 110 and services 131, may be operable by microprocessor 102 to perform various actions, operations, or functions of SD-WAN appliance 80. For example, microprocessor 102 of SD-WAN appliance 80 may retrieve and execute instructions stored by various data stores that cause microprocessor 102 to perform the operations of traffic engine 110 and services 131.

One or more storage components (e.g., RIB 104) within SD-WAN appliance 80 may store information for processing during operation of SD-WAN appliance 80 (e.g., SD-WAN appliance 80 may store data accessed by traffic engine 110 and services 131 during execution at SD-WAN appliance 80). In some examples, the storage component is a temporary memory, meaning that a primary purpose of the storage component is not long-term storage. Storage components on SD-WAN appliance 80 may be configured for short-term storage of information as volatile memory and therefore not retain stored contents if powered off.

Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with traffic engine 110 and services 131. Storage components 248 may include a memory configured to store data or other information associated with traffic engine 110 and services 131.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by SD-WAN appliance 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MILS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of SD-WAN appliance 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (UPC), modular port concentrator (MPC), flexible physical interface card (PIC) concentrator (FPC), or another line card, for example, that is insertable within a chassis or combination of chassis of SD-WAN appliance 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for SD-WAN appliance 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of SD-WAN appliance 80. Operations may be performed, for example, on each packet based on any of a corresponding ingress interface, an ingress PFE 114, an egress PFE 114, an egress interface or other components of SD-WAN appliance 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of SD-WAN appliance 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 3, control unit 82 provides an operating environment for traffic engine HO. In some examples, control unit 82 may use traffic engine 110 to execute one or more TWAMP or RPM logical roles, such as a control client, a server, a sessions sender, and a session reflector.

In accordance with the techniques described herein, SD-WAN appliance 80 may adapt the probing functions using the real-time application traffic pattern. Synthetic probe parameters will be dynamically adjusted depending on different application traffic. These parameters derived from the application traffic include the application differentiated services code point (DSCP), the forwarding class (e.g., such that the probes and application both use the same forwarding class, such as the best-effort forwarding class, the expedited forwarding class, the assured forwarding class, or the network-control forwarding class), the packet size (e.g., a minimum, a maximum, and/or an average), and a burst presence/size. The SD-WAN appliance may determine this information using deep packet inspection (DPI) on the traffic as it is received. If bursts are observed, the SD-WAN appliance may inject synthetic probes along with the application burst to detect the application SLA metrics during the burst. The SD-WAN appliance may not generate a synthetic burst, as the synthetic burst may actually degrade the system and network state. Burst means that the interval between the packets is very small, and much less than normal packet transfers. This is to say that the number of packets transferred per unit of time is high.

The SD-WAN appliance may also adjust the synthetic probing process based on the system state and application traffic. Synthetic probes exert a load on the system. These probes cause extra traffic, which actually consume the network bandwidth and also consume the other system resources. By probing too frequently, the SD-WAN appliance may induce increased round trip time (RTT) and jitter values for the real traffic as well. By probing too conservatively, in terms of probes/second, the SD-WAN appliance may create inaccurate RTT and jitter measurements.

With regards to the frequency of probing, the SD-WAN appliance may be configured to generate probes to match the real application traffic. In the case of application traffic having a consistent traffic pattern (nearly constant PPS), the SD-WAN appliance may generate probes at a constant time interval. For example, every 100 ms, the SD-WAN appliance may generate one probe. If the system is experiencing egress queue overflow or high CPU usage, the time interval can be increased to in an effort to reduce the synthetic probe traffic.

In the case of the real time application not having a constant traffic rate, the SD-WAN appliance may generate synthetic probes in proportion to the real traffic as predicted using the historical models. For example, the SD-WAN appliance may generate probes at a ratio of 1:N, where N is the number of packets of real application traffic such that, for every N packets of application, the SD-WAN appliance generates a single probe packet. If the system is experiencing egress queue overflow or high CPU usage, the value of N can be increased to reduce the synthetic probe traffic.

In accordance with the techniques described herein, traffic engine 110 may receive an application data packet of a data flow for an application. Traffic engine 110 may then send a first set of one or more probe packets over each of one or more links to measure QoE metrics for the respective link, where the first set of one or more probe packets are sent in accordance with a probing profile that includes one or more characteristics of the first set of one or more probe packets sent over each of the one or more links. Traffic engine 110 may monitor the data flow to determine one or more characteristics of the data flow. The one or more characteristics of the data flow may include one or more of a traffic rate over time indicating an amount of data received per unit of time throughout the duration of the data flow, a differentiated services code point, a forwarding class, a packet size, a burst presence, or a burst size. The amount of data received per unit of time may be in the form of a number of bytes received per unit of time or a number of packets received per unit of time.

Traffic engine 110 may generate, based on the one or more characteristics of the data flow, an updated probing profile that includes one or more updated characteristics of a second set of one or more probe packets to be sent over each of the one or more links to measure the QoE metrics for the respective link. In the updated probing profile, at least one of the updated characteristics differs from the one or more characteristics of the initial probing profile. In essence, the updated probing profile includes a dynamic set of one or more properties for the second set of one or more probe packets that change over time based on the one or more characteristics for the data flow at a particular time. Traffic engine 110 may send the second set of one or more probe packets over each of the one or more links in accordance with the updated probing profile, thereby refraining from sending any additional probe packets in accordance with the initial probing profile.

One of the characteristics of the data flow may be the traffic rate over time indicating an amount of data received per unit of time throughout the duration of the data flow. In such a case, traffic engine 110 may determine a frequency unit for the updated probing profile based on a consistency metric for the data flow.

For instance, traffic engine 110 may determine an amount of change of the traffic rate for the data flow throughout a duration of the data flow. In response to determining that the amount of change of the traffic rate is greater than a threshold amount of change, meaning that the data flow is inconsistent in the amount of data being transmitted at any given time, traffic engine 110 may determine that a frequency of probe packet transmission included in the updated probing profile is a probe packet to be sent for every N number of application data packets received in the data flow. Traffic engine 110 may use this unit in the frequency such that extraneous probes are not sent over the respective links in times of low usage, while also enabling traffic engine 110 to send an amount of probes suitable for high usage times. A value of N is dynamically based on and inversely correlated with either a currently projected traffic rate for the data flow or a peak traffic rate for the data flow. In other words, the more data that is projected to be in the data flow at any point in time (either through the use of application traffic model 94 or by a real-time measurement of the data flow), the more probe packets will be sent over the necessary links. In this way, SLA violations may be more quickly corrected when traffic engine 110 is handling large amounts of data.

Conversely, traffic engine 110 may determine that the amount of change of the traffic rate is less than a threshold amount of change, meaning that the data flow is relatively consistent for the traffic rate. As such, traffic engine 110 may determine that the frequency of probe packet transmission included in the updated probing profile is a probe packet to be sent per unit of time, Traffic engine 110 may use this unit in the frequency such that the probes consistently follow the pattern of the consistent traffic. However, in this instance, the unit of time may still be dynamically based on and inversely correlated with a currently projected traffic rate for the data flow, an average traffic rate for the data flow, a modal traffic rate for the data flow, or a peak traffic rate for the data flow. In other words, the more data that is projected to be in the data flow at any point in time (either through the use of application traffic model 94 or by a real-time measurement of the data flow), the more probe packets will be sent over the necessary links. In this way, SLA violations may be more quickly corrected when traffic engine 110 is handling large amounts of data.

Due to traffic engine 110 is monitoring the data flow, traffic engine 110 may generate, based on the one or more characteristics of the data flow, application traffic model 94 for the application, and store application traffic model 94 in memory. Traffic engine 110 may then receive, at a later time, an application data packet of a second data flow for the application. Traffic engine 110 may then access application traffic model 94 for the application and determine, based on application traffic model 94, a predicted probe profile that includes one or more predicted characteristics of a third set of one or more probe packets to be sent over each of the one or more links to measure the QoE metrics for the respective link. Traffic engine 110 may send the third set of one or more probe packets over each of the one or more links in accordance with the predicted probing profile. While the data flow is being received, traffic engine 110 may monitor the one or more characteristics of the data flow and update application traffic model 94 based on the one or more characteristics of the data flow.

When storing application traffic model 94 for the application in memory, traffic engine 110 may store application traffic model 94 along with an indication of the application. For instance, traffic engine 110 may perform deep packet inspection on the application data packet to determine an application signature of the application data packet and store application traffic model 94 in the database along with the application signature.

In some examples, traffic engine 110 may detect a flow event for the data flow, such as an egress queue overflow or a high central processing unit usage. In response to detecting the flow event, traffic engine 110 may reduce the frequency in the probing profile while the flow event persists.

As such, the synthetic probing process becomes real time in nature, using a balanced approach of probing. The SD-WAN appliance that implements the techniques described herein may significantly reduce the probability of fake negative and false positive SLA violations. By using the techniques described herein, there may not be any manual intervention required to improve the accuracy, and the SD-WAN may not generate a synthetic burst, which can degrade the system and network state. The SD-WAN appliance may adjust the load on the system dynamically, as per real application traffic and/or predicted traffic using the historical model, thereby reducing the bandwidth consumed by the SD-WAN appliance and increasing the efficiency of the SD-WAN system. In this manner, the techniques of this disclosure provide a practical application that improves the functioning of the SD-WAN appliance.

Figure 4A:
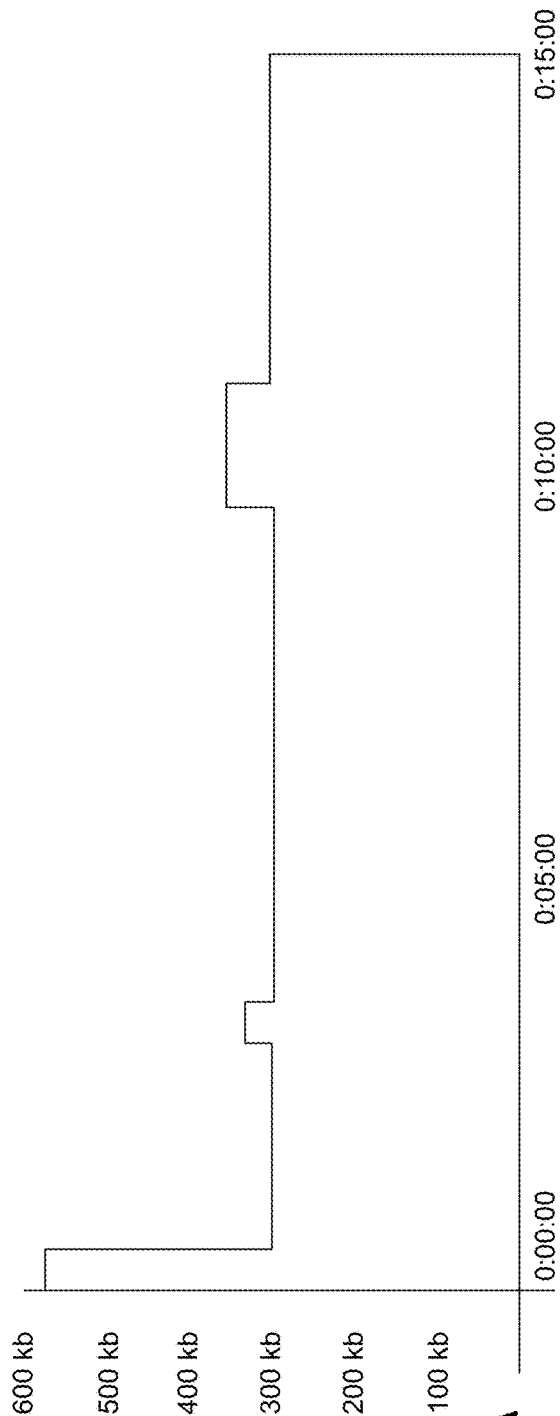
FIGS. 4A and 4B are conceptual diagrams illustrating example historical models of application traffic to be used in adjusting probing frequencies and parameters, in accordance with the techniques of this disclosure.
Figure 4B:
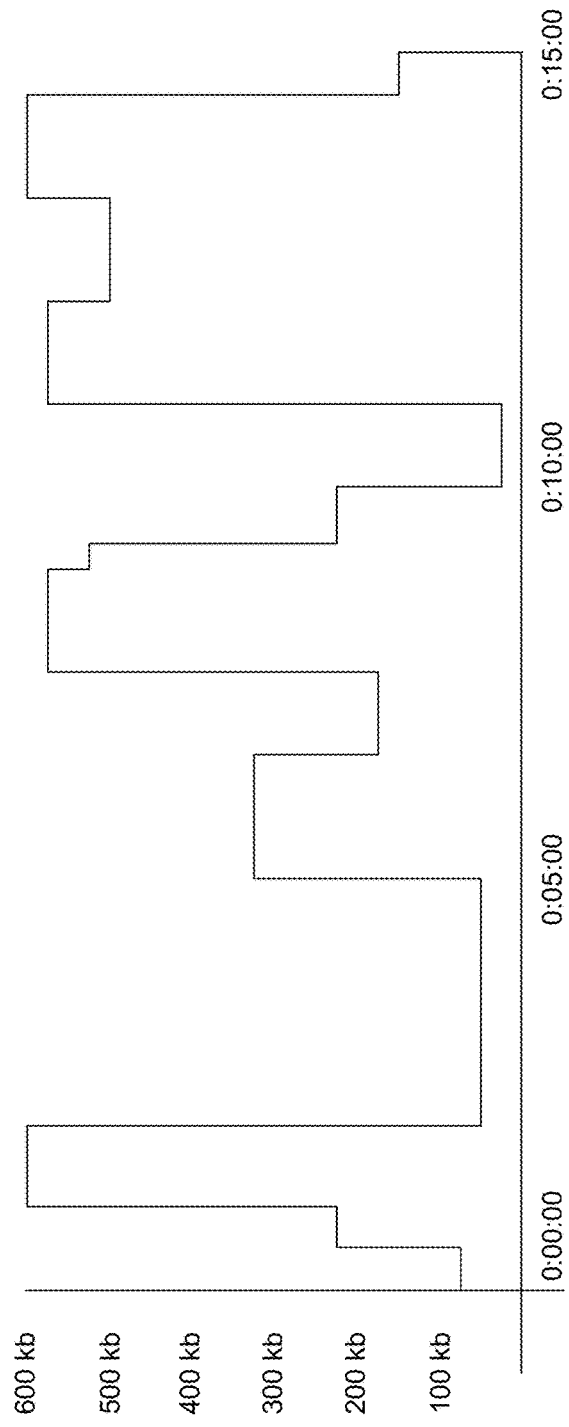

FIGS. 4A and 4B are conceptual diagrams illustrating example historical models of application traffic to be used in adjusting probing frequencies and parameters, in accordance with the techniques of this disclosure. Each of FIGS. 4A and 4B are shown on axes with the X-axis showing moments of time in h:mm:ss format, with the Y-axis showing an amount of data per second being transmitted in the data flow. FIG. 4A shows an application with a relatively consistent data flow, while FIG. 4B shows an application with a relatively erratic data flow.

In the example of FIG. 4A, at the beginning of the transmission, the data flow may transmit a large amount. However, shortly after the beginning of the transmission, the data flow may level out to a consistent 300 kb/s stream. Although there are a few blips along the way that increase the amount of data-per-second being transmitted via the data flow, the data flow is relatively consistent. In accordance with the techniques described herein, the SD-WAN appliance may determine that the frequency of the probe packets in the updated probing profile will be in a packet per unit of time, such as a probe packet transmitted every 30 ms.

In the example of FIG. 4B, at the beginning of the transmission, the data flow may transmit only a small amount of data. Shortly after the beginning of the transmission, the data flow jumps up over 100 kb/s, and then jumps up again to transmitting 600 kb/s for a brief amount of time. After this jump, the data flow then drops down to below 100 kb/s for a prolonged period of time. These inconsistent jumps up and down in traffic rate for the data flow leads to this being a relatively inconsistent data flow. In accordance with the techniques described herein, the SD-WAN appliance may determine that the frequency of the probe packets in the updated probing profile will be in a packet per N number of data packets transmitted in the data flow, such as a probe packet transmitted for every 10 data packets transmitted in the data flow.

Figure 5:
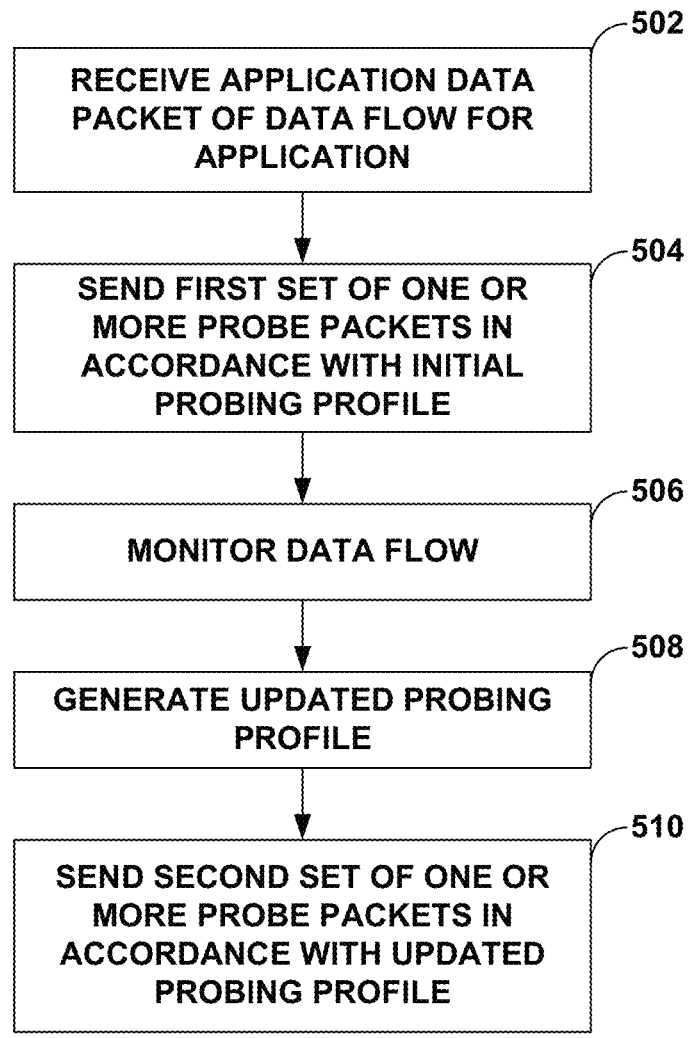
FIG. 5 is a flow diagram illustrating an example operation of a network device in accordance with the techniques of this disclosure.

FIG. 5 is a flow diagram illustrating an example technique for a software-defined wide area network system that performs probing frequency and parameter adjustment functions based on current and/or historical application traffic, in accordance with the techniques of this disclosure. The example operation may be performed by traffic engine 110 executed on SD-WAN appliance 18 from FIG. 1. The following are steps of the process, although other examples of the process performed in the techniques of this disclosure may include additional steps or may not include some of the below-listed steps.

In accordance with the techniques described herein, traffic engine 110 may receive an application data packet of a data flow for an application (502). Traffic engine 110 may then send a first set of one or more probe packets over each of one or more links to measure QoE metrics for the respective link, where the first set of one or more probe packets are sent in accordance with a probing profile, stored in application traffic model 94, that includes one or more characteristics of the first set of one or more probe packets sent over each of the one or more links (504). Traffic engine 110 may monitor the data flow to determine one or more characteristics of the data flow (506). Traffic engine 110 may generate, based on the one or more characteristics of the data flow, an updated probing profile, stored in application traffic model 94, that includes one or more updated characteristics of a second set of one or more probe packets to be sent over each of the one or more links to measure the QoE metrics for the respective link (508). In the updated probing profile, at least one of the updated characteristics differs from the one or more characteristics of the initial probing profile. Traffic engine 110 may send the second set of one or more probe packets over each of the one or more links in accordance with the updated probing profile (510), and refrains from sending any additional probe packets in accordance with the initial probing profile.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

The invention claimed is:

1. A method comprising:
in response to receiving, by a network device, an application data packet of a data flow for an application, sending, by the network device, a first set of one or more probe packets over each of one or more links to measure quality of experience (QoE) metrics for the respective link, wherein the first set of one or more probe packets are sent in accordance with an initial probing profile that includes one or more characteristics of the first set of one or more probe packets sent over each of the one or more links;
monitoring, by the network device and subsequent to sending the first set of one or more probe packets, subsequently received application data packets of the data flow to determine one or more characteristics of the data flow;
generating, by the network device and based on the one or more characteristics of the data flow, an updated probing profile that includes one or more updated characteristics of a second set of one or more probe packets to be sent over each of the one or more links to measure the QoE metrics for the respective link, wherein at least one of the updated characteristics differs from the one or more characteristics of the initial probing profile;
sending, by the network device, the second set of one or more probe packets over each of the one or more links in accordance with the updated probing profile; and
selecting, by the network device and based on the QoE metrics measured by the second set of one or more probe packets, a link of the one or more links on which to forward additional received application data packets of the data flow.

2. The method of claim 1, wherein the one or more characteristics includes at least a traffic rate over time indicating an amount of data received per unit of time throughout a duration of the data flow, wherein the method further comprises:
generating, by the network device and based on the one or more characteristics of the data flow, an application traffic model for the application; and
storing, by the network device, the application traffic model in memory.

3. The method of claim 2, wherein the data flow comprises a first data flow, wherein the method further comprises:
in response to receiving, by the network device, an application data packet of a second data flow for the application, accessing, by the network device, the application traffic model for the application;
determining, by the network device and based on the application traffic model, a predicted probe profile that includes one or more predicted characteristics of a third set of one or more probe packets to be sent over each of the one or more links to measure the QoE metrics for the respective link, wherein the predicted probe profile includes at least a frequency at which the probe packets of the third set of one or more probe packets; and
sending, by the network device, the third set of one or more probe packets over each of the one or more links in accordance with the predicted probing profile.

4. The method of claim 2, wherein the amount of data received per unit of time comprises one or more of a number of bytes received per unit of time or a number of packets received per unit of time.

5. The method of claim 2, further comprising:
updating, by the network device, the application traffic model based on the one or more characteristics of the data flow.

6. The method of claim 2, wherein storing the application traffic model for the application comprises:
performing, by the network device, deep packet inspection on the application data packet to determine an application signature of the application data packet; and
storing, by the network device, the application traffic model in the database along with the application signature.

7. The method of claim 1, further comprising:
determining, by the network device, an amount of change of a traffic rate for the data flow throughout a duration of the data flow;
in response to determining that the amount of change of the traffic rate is greater than a threshold amount of change, determining, by the network device, that a frequency of probe packet transmission included in the updated probing profile is a probe packet to be sent for every N number of application data packets received in the data flow, wherein a value of N is dynamically based on and inversely correlated with a currently projected traffic rate for the data flow or a peak traffic rate for the data flow; and
in response to determining that the amount of change of the traffic rate is less than a threshold amount of change, determining, by the network device, that the frequency of probe packet transmission included in the updated probing profile is a probe packet to be sent per unit of time, wherein the unit of time is dynamically based on and inversely correlated with the currently projected traffic rate for the data flow or the peak traffic rate for the data flow.

8. The method of claim 1, wherein the updated probing profile comprises a dynamic set of one or more properties for the second set of one or more probe packets that change over time based on the one or more characteristics for the data flow at a particular time.

9. The method of claim 1, wherein the one or more characteristics of the data flow includes one or more of a traffic rate over time indicating an amount of data received per unit of time throughout a duration of the data flow, a differentiated services code point, a forwarding class, a packet size, a burst presence, or a burst size.

10. The method of claim 1, further comprising:
detecting, by the network device, a flow event for the data flow, wherein the flow event comprises one or more of an egress queue overflow or a high central processing unit usage; and
in response to detecting the flow event, reducing, by the network device, the frequency in the probing profile while the flow event persists.

11. The method of claim 1, wherein sending the second set of one or more probe packets over each of the one or more links in accordance with the updated probing profile comprises:
refraining, by the network device, from sending further probe packets of the first set of one or more probe packets when sending the second set of one or more probe packets.

12. The method of claim 1, wherein a first link of the plurality of links comprises a plurality of queues,
wherein sending the second set of one or more probe packets over the first link in accordance with the updated probing profile comprises sending, by the network device, the second set of one or more probe packets over each queue of the plurality of queues in the first link to measure the QoE metrics for each respective queue of the first link.

13. A network device comprising:
a memory configured to store a reference data store; and
one or more processors in communication with the memory, the one or more processors configured to:
in response to receiving an application data packet of a data flow for an application, send a first set of one or more probe packets over each of one or more links to measure quality of experience (QoE) metrics for the respective link, wherein the first set of one or more probe packets are sent in accordance with a probing profile that includes one or more characteristics of the first set of one or more probe packets sent over each of the one or more links;
subsequent to sending the first set of one or more probe packets, monitor subsequently received application data packets of the data flow to determine one or more characteristics of the data flow;
generate, based on the one or more characteristics of the data flow, an updated probing profile that includes one or more updated characteristics of a second set of one or more probe packets to be sent over each of the one or more links to measure the QoE metrics for the respective link, wherein at least one of the updated characteristics differs from the one or more characteristics of the initial probing profile;
send the second set of one or more probe packets over each of the one or more links in accordance with the updated probing profile; and
select, based on the QoE metrics measured by the second set of one or more probe packets, a link of the one or more links on which to forward application data packets of the data flow.

14. The network device of claim 13, wherein the one or more characteristics includes at least a traffic rate over time indicating an amount of data received per unit of time throughout a duration of the data flow, wherein the data flow comprises a first data flow, and wherein the one or more processors are further configured to:

generate, based on the one or more characteristics of the first data flow, an application traffic model for the application;

store the application traffic model in memory;

in response to receiving an application data packet of a second data flow for the application, access the application traffic model for the application;

determine, based on the application traffic model, a predicted probe profile that includes one or more predicted characteristics of a third set of one or more probe packets to be sent over each of the one or more links to measure the QoE metrics for the respective link, wherein the predicted probe profile includes at least a frequency at which the probes of the third set of one or more probe packets; and send the third set of one or more probe packets over each of the one or more links in accordance with the predicted probing profile.

15. The network device of claim 13, wherein the one or more processors are further configured to:

determine an amount of change of a traffic rate for the data flow throughout a duration of the data flow;

in response to determining that the amount of change of the traffic rate is greater than a threshold amount of change, determine that a frequency of probe packet transmission included in the updated probing profile is a probe packet to be sent for every N number of application data packets received in the data flow, wherein a value of N is dynamically based on and inversely correlated with a currently projected traffic rate for the data flow or a peak traffic rate for the data flow; and in response to determining that the amount of change of the traffic rate is less than a threshold amount of change, determine that the frequency of probe packet transmission included in the updated probing profile is a probe packet to be sent per unit of time, wherein the unit of time is dynamically based on and inversely correlated with the currently projected traffic rate for the data flow or the peak traffic rate for the data flow.

16. The network device of claim 13, wherein the updated probing profile comprises a dynamic set of one or more properties for the second set of one or more probe packets that change over time based on the one or more characteristics for the data flow at a particular time.

17. The network device of claim 13, wherein the one or more characteristics of the data flow includes one or more of a traffic rate over time indicating an amount of data received per unit of time throughout a duration of the data flow, a differentiated services code point, a forwarding class, a packet size, a burst presence, or a burst size.

18. The network device of claim 13, wherein the device comprises a software-defined networking (SDN) device.

19. A non-transitory computer-readable storage medium storing instructions thereon that when executed cause one or more processors, via execution of a software-defined networking (SDN) device, to:

in response to receiving an application data packet of a data flow for an application, send a first set of one or more probe packets over each of one or more links to measure quality of experience (QoE) metrics for the respective link, wherein the first set of one or more probe packets are sent in accordance with a probing profile that includes one or more characteristics of the first set of one or more probe packets sent over each of the one or more links;

subsequent to sending the first set of one or more probe packets, monitor subsequently received application data packets of the data flow to determine one or more characteristics of the data flow;

generate, based on the one or more characteristics of the data flow, an updated probing profile that includes one or more updated characteristics of a second set of one or more probe packets to be sent over each of the one or more links to measure the QoE metrics for the respective link, wherein at least one of the updated characteristics differs from the one or more characteristics of the initial probing profile;

send the second set of one or more probe packets over each of the one or more links in accordance with the updated probing profile; and select, based on the QoE metrics measured by the second set of one or more probe packets, a link of the one or more links on which to forward application data packets of the data flow.

20. The non-transitory computer-readable storage medium of claim 19, wherein the one or more characteristics includes at least a traffic rate over time indicating an amount of data received per unit of time throughout a duration of the data flow, wherein the data flow comprises a first data flow, and wherein the instructions, when executed, further cause the one or more processors to:

generate, based on the one or more characteristics of the first data flow, an application traffic model for the application;

store the application traffic model in memory;

in response to receiving an application data packet of a second data flow for the application, access the application traffic model for the application;

determine, based on the application traffic model, a predicted probe profile that includes one or more predicted characteristics of a third set of one or more probe packets to be sent over each of the one or more links to measure the QoE metrics for the respective link, wherein the predicted probe profile includes at least a frequency at which the probes of the third set of one or more probe packets; and send the third set of one or more probe packets over each of the one or more links in accordance with the predicted probing profile.

* * * * *